Jan. 18, 1927. 1,614,919
C. A. DUNHAM
TEMPERATURE INDICATOR FOR ENGINES
Filed Sept. 5, 1925    3 Sheets-Sheet 3
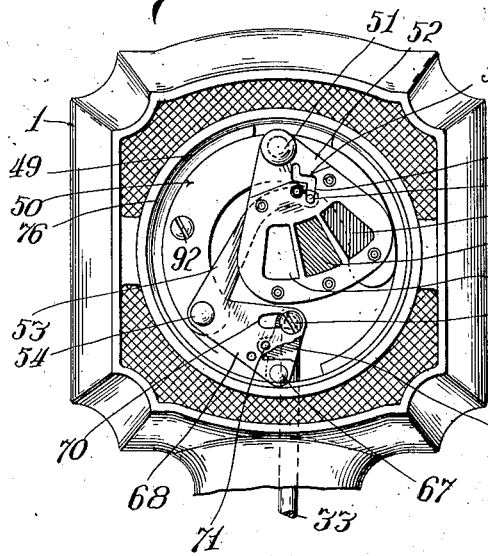
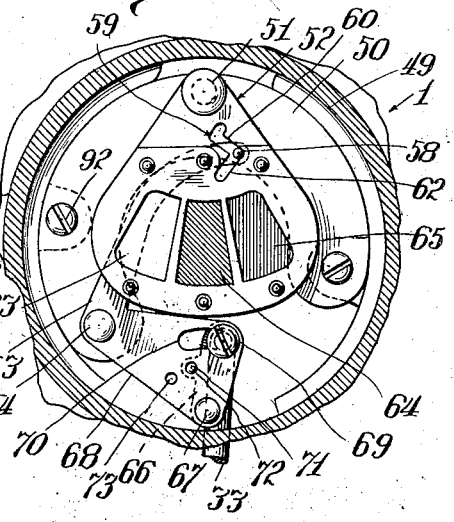
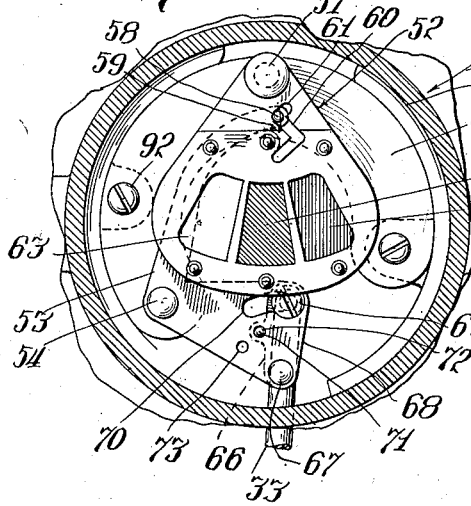
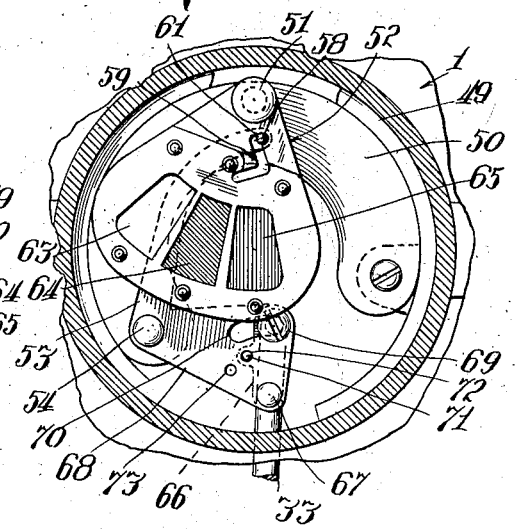
Inventor
Clayton A. Dunham
By Barnett & Truman
Attorneys.

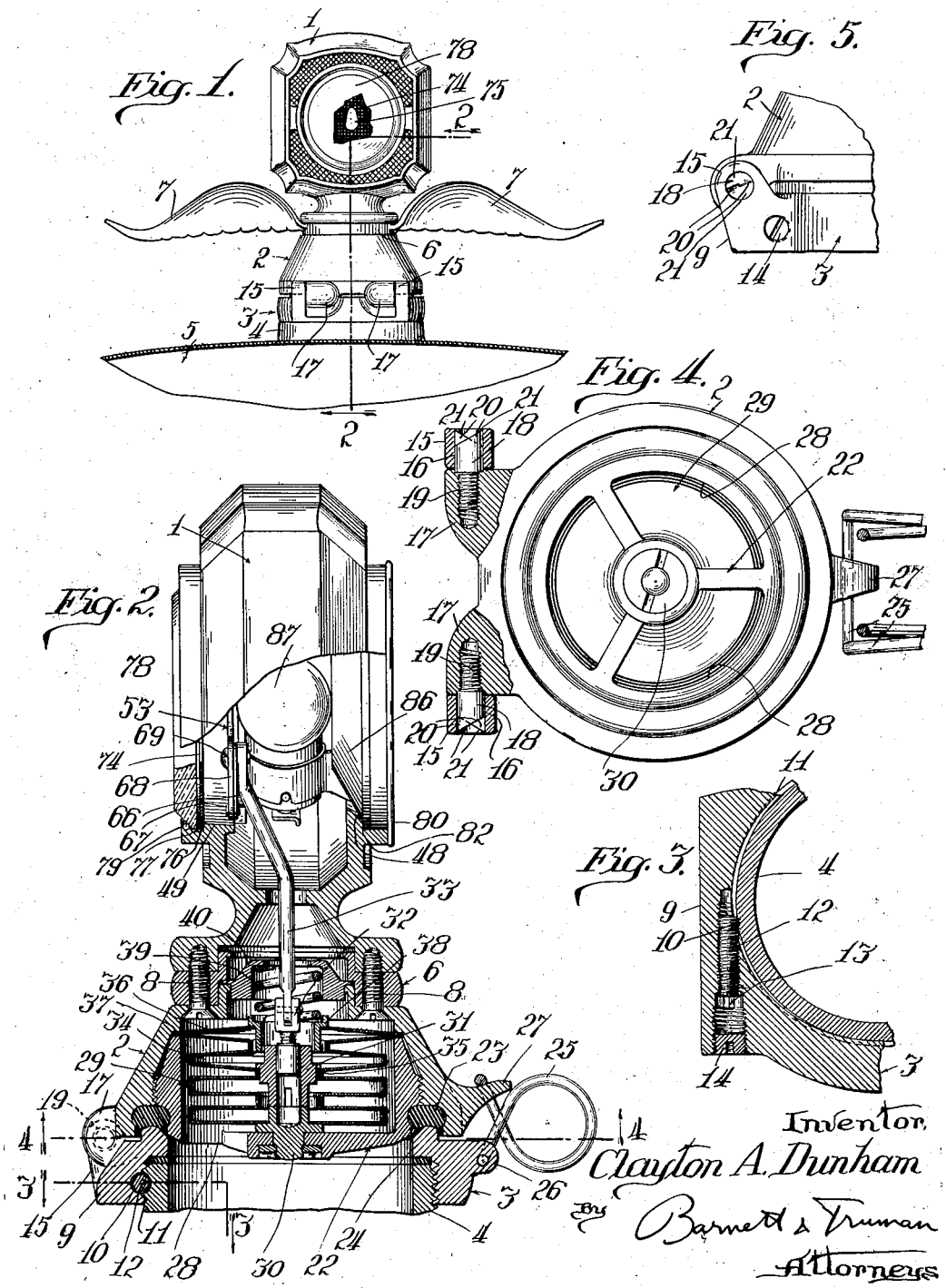

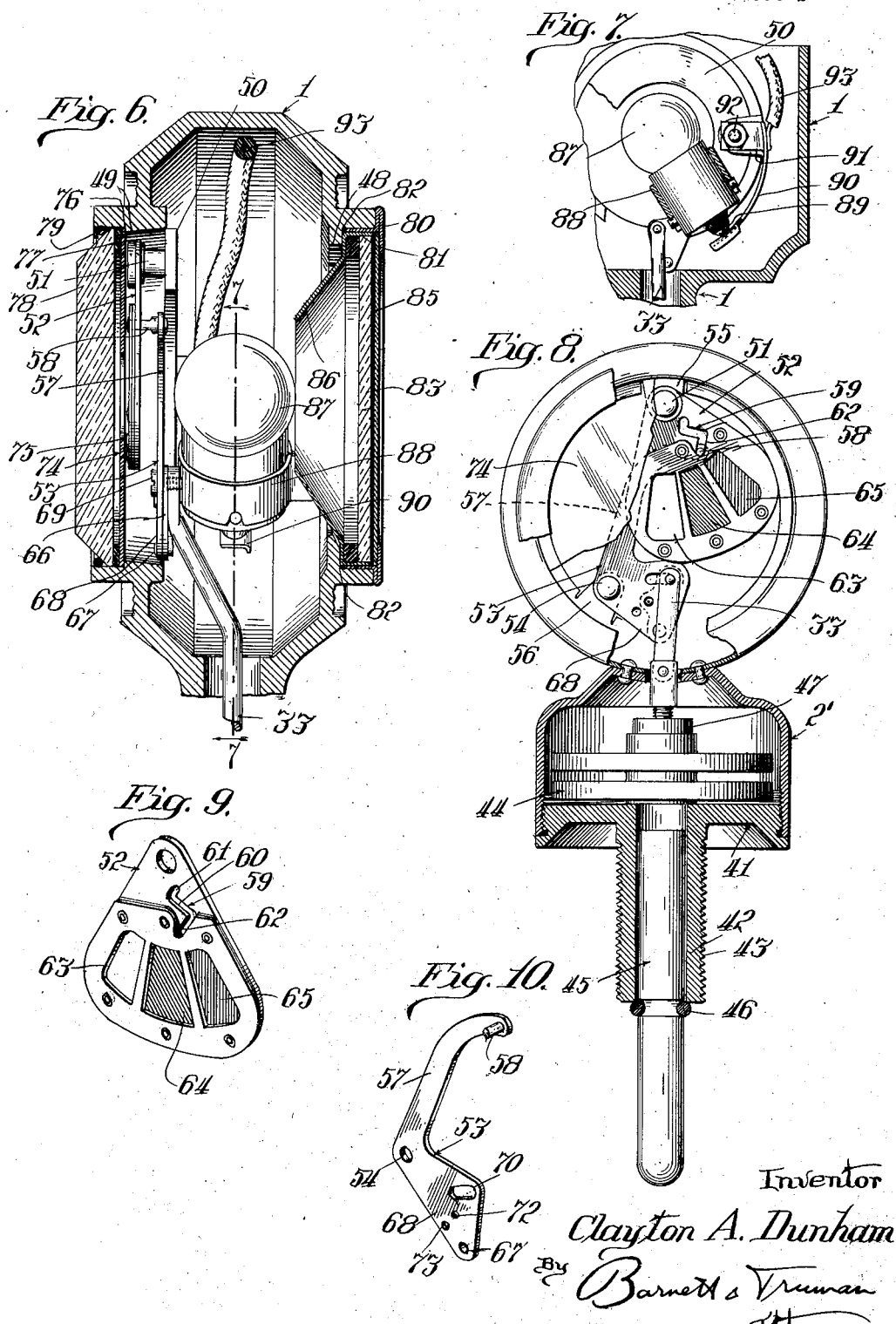

Patented Jan. 18, 1927.

1,614,919

UNITED STATES PATENT OFFICE.

CLAYTON A. DUNHAM, OF GLENCOE, ILLINOIS, ASSIGNOR TO DUNHAMETER CORPORATION, OF CHICAGO, ILLINOIS, A CORPORATION OF ILLINOIS.

TEMPERATURE INDICATOR FOR ENGINES.

Application filed September 5, 1925. Serial No. 54,743.

This invention relates to a temperature indicator for engines, and particularly to such an indicator adapted to be mounted on the radiator spout of an automobile to indicate the temperature of the liquid in the circulating cooling system.

This particular improvement relates to an indicator of this type which will display three separate and distinct color signals, one of them, for example, a green signal, being normally in view while the engine is operating within a permissible range of temperatures. When the engine becomes overheated and passes a certain critical temperature, the signal is shifted to display a different color, for example red. When the temperature falls below the point where the motor can operate efficiently, the indicating means is shifted in the opposite direction to display a third color signal, for example white.

The particular object of this invention is to provide an indicating mechanism which will display a plurality of different distinct signals alternatively in accordance with the temperature condition of the engine, as above described.

Another object is to provide an improved shifting means, whereby continuous movement of the temperature controlled operating mechanism will produce intermittent movements of the shutter which carries the different color signals.

Another object is to provide means for adjusting the range of temperatures indicated by each signal, that is to vary the critical temperatures at which the signals will be changed. By this means the device can be adapted for winter driving, when the presence of alcohol or other non-freezing liquid in the radiator will change the permissible range of operating temperatures.

Another object is to provide a new form of thermostatic disk, and the mounting therefor in the lower portion of the temperature indicator.

Another object is to provide an improved shielding diaphragm, to form a steam tight partition between the temperature responsive device in the lower portion of the apparatus, and the indicating mechanism in the upper portion thereof.

Another object is to provide an improved mounting or support for the lamp which illuminates the signals.

Other objects and advantages of the invention will be apparent from the following detailed description of certain approved forms of the apparatus.

In the accompanying drawings:

Fig. 1 is a rear elevation of the device as mounted in position on the spout of the automobile radiator.

Fig. 2 is a transverse vertical section, on an enlarged scale, taken substantially on the line 2—2 of Fig. 1.

Fig. 3 is an enlarged detail horizontal section taken substantially on the line 3—3 of Fig. 2.

Fig. 4 is a horizontal section taken substantially on the line 4—4 of Fig. 2.

Fig. 5 is a detail elevation of the hinge.

Fig. 6 is an enlarged central vertical section, corresponding substantially to the upper portion of Fig. 2.

Fig. 7 is a detail section through the lamp and its mounting, the view being taken substantially on the line 7—7 of Fig. 6.

Fig. 8 is a transverse vertical section through a modified form of indicator. The indicating mechanism in the upper portion of this view is substantially the same as that shown in the other figures. The modified construction is shown in the lower thermostatic portion of the device.

Fig. 9 is a perspective view of the signal shutter.

Fig. 10 is a perspective view of the bell crank lever for operating the shutter.

Fig. 11 is an elevation of the shutter and operating mechanism in the positions shown when the engine is at sub-normal temperature, that is, too cold to operate efficiently.

Fig. 12 is a similar view showing the positions of the parts when the temperature of the engine has just risen to normal, and the shutter has been shifted to show the normal operating signal.

Fig. 13 is a similar view showing the parts when the temperature has risen to the upper limit of the normal operating temperature range, and is at that critical temperature where further rise will cause the danger signal to be shifted into view.

Fig. 14 is a similar view showing the positions of the parts when the engine has become overheated, and the danger signal is being displayed.

The working parts of the apparatus are housed in an upper casing 1 and a lower casing 2, which latter is hinged to a spout ring 3 which is screwed onto the spout 4 of the automobile radiator 5, in lieu of the usual radiator cap. If desired, a ring 6, which serves as a support for the wings 7 or other ornamental means, may be secured between the upper casing part 1 and the lower casing 2 as by means of the concealed screws 8. This ring 6 and the ornaments carried thereby, are merely added for ornamental purposes and may be omitted as they form no part of the operating signal device.

In the enlarged hinge block 9 at the rear of spout ring 3, there is an interiorly threaded passage 10 which intersects tangentially the screw threaded inner portion 11 of the spout ring 3. A locking screw 12 is adapted to be screwed into the inner portion of this passage 10 so that it will engage with the threads on the spout 4 and lock the ring 3 against removal. Screw 12 is much shorter than the passage 10, and when in locking position will be completely within the passage with its reduced operating head 13 inaccessible except with the aid of a specially designed key having a socket adapted to fit this head 13. The outer end of passage 10 is closed by a screw plug, or dummy screw 14. Although this plug 14 may be removed with an ordinary screw driver, the locking screw 12 will remain inaccessible unless the specially designed key is at hand, so that theft of the apparatus is impossible with ordinary tools.

A pair of hinge lugs 15, having aligned cylindrical journal openings 16, project upwardly from hinge block 9 at the rear of ring 3. The lower casing member 2 is provided with a hinge lug 17, or pair of lugs, adapted to fit between the lugs 15 on the spout ring. Pivot screws 18 having cylindrical heads adapted to fit within the journal openings 16, are screwed into lugs 17 at 19. When these screws are completely inserted, the heads 18 are entirely housed within the passages 16. The two halves of the head of each screw are cut away in oppositely inclined planes, so as to provide a pair of opposite shoulders 20 which may be engaged with a suitably forked tool to screw the journals into place when the cylindrical passages 16 are aligned with the screw threaded passages in lugs 17. However, when these screws have been completely inserted, they cannot be removed, since the inclined surfaces 21 present no obstructions with which a tool can be engaged to remove the screws. This will prevent theft of the upper portion of the indicating apparatus, by detaching same from the spout ring.

A spider 22 is screwed into the bottom of casing member 2, and a rubber gasket 23 is clamped in suitable mating annular recesses at the lower edges of the spider and casing member. Gasket 23 is adapted to be clamped against the upper annular flange 24 on ring 3, by means of the spring clasp 25, hinged in lug 26 on ring 3 and adapted to be snapped over lug 27 on casing member 2. By removing this spring clasp the entire indicating device may be swung back about the hinges 18 in order to fill the radiator 5 with water. The spider 22 is provided with a series of open passages 28 through which steam from the radiator can contact directly with the thermostatic element 29. This thermostat or heat responsive element is here shown as a flexible corrugated, metallic diaphragm, closed at its lower end by a plug 30 which is anchored in spider 22, and closed at its upper end by a plug 31 having hinged connections 32 with the operating stem or rod 33 which extends upwardly to the indicating mechanism in casing 1. The diaphragm 29 is filled with a fluid which volatilizes at a predetermined temperature to cause the expansion of the flexible housing of the thermostat. A second flexible corrugated diaphragm 34 is anchored at its inner edge 35 to the upper plug 31, and at its outer edge to the casing 2 so as to form a steam tight shield between the lower casing 2 and the upper casing 1 to protect the indicating mechanism from the injurious effects of the steam. As here shown, the outer edge of the upper section 36 of diaphragm 34 is anchored between the upper edge of spider 22 and a shoulder 37 in casing 2. The inner edge of the upper section 36 is connected to a thimble 38 and a compression spring 39 is confined between thimble 38 and a thimble 40 anchored in the casing. This spring tends to resist the steam pressure and expansion of the thermostat 29, and returns the parts to their unexpanded position when the temperature falls.

A simplified form of this lower portion of the device is shown in Fig. 8. The closure 41, screwed into the lower end of casing part 2', is provided with a central downwardly projecting tubular portion 42, threaded at 43 to engage with a correspondingly threaded portion of the engine or radiator. The thermostatic element comprises a corrugated diaphragm 44 in casing 2', and a tubular well 45 for the expansible fluid, which projects down through member 42 into the steam space of the engine or radiator. The locking ring 46 serves to hold the thermostat in place. The upper end of the thermostat is connected at 47 with the stem 33, as previously described.

The upper casing 1 is provided with aligned circular openings 48 and 49 in the front and rear respectively, to permit illumination and observation of the indicating device. An arcuate supporting plate 50 is mounted on suitable lugs projecting inwardly from casing 1 adjacent the opening 49. A pivot pin 51 projects rearwardly from the upper part of supporting plate 50 to provide a rocking support for the indicating shutter 52. The operating bell crank lever 53 is hinged at 54 near one lower end of the arcuate supporting plate 50. In the simplified construction shown in Fig. 8, the supporting plate 50 is omitted, and the shutter and bell crank lever are pivoted directly on lugs 55 and 56 respectively, projecting inwardly from the sheet metal housing 1'. The longer upper arm 57 of the bell crank lever carries a pin 58 which engages in the angular slot 59 in shutter 52. Slot 59 comprises a central portion 60 which is struck substantially on an arc centered in the pivot 54 for the bell crank lever, and oppositely extending end portions 61 and 62 projecting at abrupt angles from the central slot 60. A plurality of colored screens 63, 64 and 65 are mounted in correspondingly shaped openings in the lower portion of shutter 52. In the form here shown screen 63 is white, screen 64 is green, and screen 65 is red. It it to be understood that these colors are merely given by way of example, and that any suitable colors or combinations of colors might be used. One end of a link 66 is pivoted at 67 to the short arm 68 of bell crank 53. A pivot screw 69 connects the upper end of link 66 with the upper end of stem 33, this screw 69 extending through an arcuate slot 70 in lever arm 68. A locking stud 71 on link 66 is adapted to engage in either of two similar apertures 72 and 73 in lever arm 68 to hold the link in either of two positions with the pivot screw 69 at either end of slot 70.

In the rear opening 49 of casing 1, an opaque plate 74 having a central sight opening 75, is positioned against a shoulder 76 in casing 1. A washer 77 is interposed between plate 74 and a glass lens 78, the assembly being held within opening 49 by a split spring locking ring 79. An assembly comprising two interfitting sheet metal annular members 80 and 81 is adapted to be inserted in the front opening 48 of the casing against a shoulder 82. A glass window 83 is clamped between members 80 and 81 against a resilient washer 84. If desired, window 83 may be made in two layers, between which is clamped a sheet of transparent material 85 on which is some insignia or advertising matter. A conical wall 86 projects inwardly from sheet metal member 81 toward an electric bulb 87, which is mounted in a bracket 88 supported on wall 86. Bulb 87 is removably secured in bracket 88 in the usual manner, as by a bayonet joint, so that the bulb may be easily replaced. As indicated more particularly in Fig. 7, one terminal of the bulb is grounded through bracket 88 and the other terminal 89 engages a spring plate 90 supported on a piece of insulating material 91, secured at 92 to the arcuate supporting plate 50. An electric conductor 93, insulated in the usual manner, extends into the lower portion of the casing and connects with spring contact 90. Wire 93 is connected with the lighting system of the car in the usual manner and bulb 87 will be illuminated whenever the car lights are turned on. If desired, suitable switch connections may be provided whereby this light may be energized in the daytime, although this is not ordinarily necessary, since the light passing through lens 78 against the face of the color screen, assisted by the light passing through the rear window 83 and the screen, will cause the screen to be clearly visible from the operator's position in the car.

In operation, when installed on the car, and the engine not running, or too cold to operate efficiently, the parts will be in the positions shown in Fig. 11. The thermostat is compressed and stem 33 is drawn down to its lowermost position. Bell crank 53 is swung clockwise until pin 58 is at the lower end 62 of angular slot 59, whereby shutter 52 is swung over to the right so that the white screen 63 is behind the sight opening 75 and visible to the operator. As the engine heats up, the thermostat will expand and the stem 33 will be elevated so as to swing bell crank 53 in a counter clockwise direction, thereby raising pin 58 in the angular slot until it reaches the right hand end of the central slot portion 60. Since slot portion 62 is at an acute angle to the direction of movement of pin 58, shutter 52 will be swung to a central position to bring the green screen 64 in line with the sight opening, as shown in Fig. 12. Further increase in temperature of the engine and circulating fluid, within the permissible range of operating temperatures, will not cause any further movement of shutter 52, since the pin 58 will merely move along the central portion 60 of the slot, which is struck about an arc centered at the pivot 54 of the lever 53. When the temperature reaches the upper critical temperature, beyond which it is dangerous to operate, the pin 58 reaches the upper end of slot portion 60 as indicated in Fig. 13. Further counter clockwise movement of lever 53, due to an increase in temperature, will throw the shutter 52 sharply over to the left, bringing the red screen 65 into view, the pin 58 passing into the angular end portion 61 of the slot. This position of the parts is shown in Fig. 14. As the engine cools off, the thermostat will contract and the parts will operate in a manner exactly the reverse of that hereinabove described.

When the car is being operated at high altitudes, or in the winter when alcohol or other non-freeze solution is used in the radiator, the boiling point of the cooling fluid will be lowered, and it is desirable to lower the upper limit of the operating temperatures, that is, provide a lower critical temperature at which the red danger signal will be brought into view. In order to make this adjustment, link 66 is moved over to the left, as shown in the drawings, so as to bring pivot screw 69 to the other end of slot 70, and to move stud 71 from locking hole 72 to locking hole 73. This adjustment will not affect the initial position of any of the parts, but will shorten the effective lower lever arm 68 of bell crank 53, so that a given movement of operating stem 33 will impart a greater movement to the bell crank lever and hence to shutter 52. In other words, the shutter will be operated at a lower temperature to display the red danger signal. By moving the link 66 to intermediate positions, the mechanism can be adjusted to compensate for variations in the operation of the thermostat to insure proper registration of the indicating mechanism under any conditions. This adjustment feature is of considerable assistance in the initial calibration of the device, when first assembled, or for re- calibration when parts are replaced, or when their range of movement becomes affected in any way. The positions of either or both of the locking members 72 and 73 can be varied to suit conditions or other equivalent locking means can be used.

It will be noted that the device when once installed on the car, is compact, and there are no accessible connections whereby it may be easily removed or stolen. At the same time the device may be easily swung back to permit refilling the radiator. The thermostatic element is directly exposed at the bottom to the steam atmosphere in the radiator, but the shielding diaphragms prevent the passage of steam into the upper casing 1 to injure or obscure the indicating mechanism. At the same time these diaphragms permit unimpeded movement of the thermostatic element as it expands or contracts in response to temperature changes. The lamp 87 will always be illuminated when the car lights are on, so that the indicator is as easily observed at night as in the daytime. The bulb 87 is carried directly by the front window assembly, which may be easily slipped in or out of the casing, and the connections to the bulb are automatically made as soon as the front window assembly is replaced. The indicator not only warns the driver when the engine has become dangerously overheated, but also gives warning when the engine temperature has fallen so low that it will not operate efficiently. So long as the temperature is anywhere within the permissible operating range, the green signal will remain in view.

I claim:

1. In a temperature indicator for automobiles, means adapted to be intermittently moved to indicate either high, low or normal temperatures, a heat sensitive element moving in response to changes of engine temperature, and connections for moving the indicating means to change its indication only when certain predetermined temperatures are reached.

2. In a temperature indicator for automobiles, movable means adapted to alternatively indicate either high, low or normal temperatures, a heat sensitive element moving in response to changes of engine temperature, and connections for moving the indicating means to change its indication only when certain predetermined critical temperatures are reached, the connections including an adjustment for changing the upper critical temperature.

3. A temperature indicator for automobile engines, comprising a movable indicating means adapted to alternatively display three distinct signals, the indicating means being normally at rest with one signal in view when the engine is operating within the permissible range of temperatures, the other two signals being respectively displayed whenever the temperature passes above or below this range, a heat sensitive element, and means actuated from the heat sensitive element in response to temperature changes for intermittently shifting the indicating means whenever either the upper or lower critical temperature is reached.

4. A temperature indicator for automobile engines, comprising a movable indicating member adapted to alternatively display three distinct signals, one of which is normally in view when the engine is operating within the permissible range of temperatures, the other two signals being respectively displayed whenever the temperature passes above or below this range, a heat sensitive element, and means actuated from the heat sensitive element in response to temperature changes having a lost-motion connection with the indicating means whereby movement of the means within the normal range of temperatures will not move the indicating member, but the means will shift the indicating member to change the signal whenever either the upper or lower critical temperature is reached.

5. A temperature indicator for automobile engines, comprising a casing having a sight opening, a movable indicating element embodying three distinct signals adapted to be alternatively displayed at the sight opening to indicate sub-normal, normal and abnormal engine temperatures, a heat sensitive element, and mechanism moved by the heat sensitive element in response to temperature changes to shift the movable member to display the sub-normal or abnormal signals as the engine temperature falls below or rises above a permitted range, but permitting the indicating element to remain at rest with the normal signal on display while the temperature is within the permitted range.

6. A temperature indicator for automobile engines, comprising a casing having a sight opening, a movable indicating element embodying three different color screens adapted to be alternatively positioned in front of the sight opening, means for illuminating the screens, a heat sensitive element, and mechanism moved by the heat sensitive element in response to changes in engine temperature to intermittently shift the indicating member to display one color signal when the engine is overheated, and another color signal when the engine is cold, the third color signal remaining normally at rest before the sight opening while the engine temperature varies within a permitted range.

7. A temperature indicator for automobile engines comprising a casing having a sight opening, a member movable in the casing so as to bring one of a plurality of different signals into a visible position at the sight opening, a heat sensitive element, and operating means including a lost-motion connection between the movable member and heat sensitive element, whereby continuous movement of the means in response to temperature changes will intermittently move the movable member to cause the signals to be successively displayed, but one signal will remain inactive and visible at the sight opening throughout a determined range of temperatures.

8. A temperature indicator for automobile engines comprising a casing having a sight opening, a multicolored member movable in the casing to bring the colors alternatively into view at the opening, said member being stationary at normal engine temperatures, a heat sensitive element, and operating connections whereby the movement of the heat sensitive element in response to temperature changes will cause the colors to be intermittently and successively shifted into position at the sight opening at certain predetermined temperatures.

9. A temperature indicator for automobile engines comprising a casing having a sight opening, a movable shutter in the casing embodying a plurality of color screens adapted to be alternatively brought into view at the sight opening, a heat sensitive element, and operating means including a lost-motion connection between the heat sensitive element and the shutter, whereby movement of the element in response to temperature changes will permit one screen to be displayed throughout the permissible range of operating temperatures, but will shift the shutter to display a different screen when the temperature rises above a critical temperature, and a third screen when the temperature falls below another critical temperature.

10. In a temperature indicator for engines, a swinging indicator having a plurality of distinct indicating positions, a heat-sensitive element, a lever, operating connections between the lever and heat sensitive element, an angular slot in the swinging indicator and a pin on one arm of the lever engaging in this slot, one portion of the angular slot being struck substantially on an arc about the fulcrum of the lever, whereby movement of the pin in this portion of the slot will produce no movement of the swinging member.

11. A temperature indicator for engines, a swinging indicator having a plurality of distinct indicating positions, a heat-sensitive element, a lever, operating connections between the lever and heat sensitive element, and a lost-motion connection between one arm of the lever and the swinging indicator whereby continuous movement of the lever will intermittently swing the indicator to its different positions.

12. In a temperature indicator for engines, a swinging indicator having three distinct indicating positions, a heat sensitive element, and lost-motion connections between this element and the swinging member whereby the indicator will be quickly swung to its different positions in response to definite changes of temperature, and will be inactive at other times.

13. In a temperature indicator for engines, a movable indicator having a plurality of indicating positions, a heat sensitive element which moves in response to temperature changes, and operating connections between the element and the indicator for moving the indicator to and from its different indicating positions, the effective length of the connections being adjustable to vary the range of temperature indications.

14. In a temperature indicator for engines, a movable indicator having a plurality of indicating positions, a heat sensitive element which moves in response to temperature changes, and operating connections between the element and the indicator, comprising an intermediately pivoted lever having one arm connected to the movable indicator and the other arm connected to the heat sensitive element and means for changing the effective length of one lever arm to vary the range of temperature indications.

15. In a temperature indicator for engines, a movable indicator having a plurality of indicating positions, a heat sensitive element which moves in response to temperature changes, and operating connections between the element and the indicator, comprising a lever connected with the indicator, a link connected with the heat sensitive element, and a shiftable connection between one end of the link and the lever to change the effective lever arm.

16. In a temperature indicator for engines, a movable indicator having a plurality of indicating positions, a heat sensitive element which moves in response to temperature changes, operating connections between the element and the indicator comprising a lever connected with the indicator, a plate pivoted on one arm of the lever, a link connecting the free end of the plate with the heat sensitive element, and means for locking the plate in different positions whereby the effective length of the lever arm is varied.

17. In a temperature indicator for engines, a movable indicator adapted to give one indication when the engine is operating within a normal range of temperatures, and to give a danger signal when the temperature rises above this range, a heat sensitive element, and operating connections between the element and indicator, adapted to move the indicator to or from its different indicating positions in response to definite temperature changes, a portion of the connections being adjustable to change the upper limit of the operating range.

18. In a temperature indicator for engines, a movable indicator adapted to give one indication when the engine is operating within a normal range of temperature, to give a danger signal when the temperature rises above a critical temperature, and to give a third signal when the temperature falls below another critical temperature, a heat sensitive element, and operating connections between the element and indicator, a portion of the connections being adjustable while in service to change the upper critical temperature.

19. In a temperature indicator for engines, a casing, an indicating shutter carrying a plurality of distinct signals pivoted for swinging movement within the casing, there being an angular slot in the shutter, a bellcrank lever pivoted in the casing, one arm of the bellcrank having a projection engaging in the slot, a heat sensitive element, and connections between the heat sensitive element and the other arm of the lever.

20. In a temperature indicator for engines, a casing, an indicating shutter carrying a plurality of distinct signals pivoted for swinging movement within the casing, there being an angular slot in the shutter, a bellcrank lever pivoted in the casing, one arm of the bellcrank having a projection engaging in the slot, a heat sensitive element, a stem projecting from the heat sensitive element, and adjustable connections between the stem and the other arm of the lever.

21. In a temperature indicator for engines, a casing, an arcuate supporting plate mounted in the casing, an indicating shutter pivoted on the arcuate plate, a bellcrank lever pivoted on the plate, there being an angular slot in the shutter, and one arm of the bellcrank having a projection engaging in the slot, a heat sensitive element, and connections between the heat sensitive element and the other arm of the lever.

22. In a temperature indicator, a casing open at its lower end, an indicating mechanism mounted in the upper portion of the casing, a thermostatic element mounted in the lower portion of the casing, comprising a hollow corrugated vessel filled with an expansible fluid, a plug within the upper end of the vessel, a flexible metallic shield extending between this plug and the walls of the casing, and a stem connecting the plug with the indicating mechanism.

23. In a temperature indicator, a casing open at its lower end, an indicating mechanism mounted in the upper portion of the casing, a thermostatic element mounted in the lower portion of the casing comprising a hollow corrugated vessel filled with an expansible fluid, with plugs in its upper and lower ends, a rigid spider connecting the lower plug with the walls of the casing, a flexible metallic diaphragm connecting the upper plug with the walls of the casing, and a stem connecting the upper plug with the indicating mechanism.

CLAYTON A. DUNHAM.

CERTIFICATE OF CORRECTION.

Patent No. 1,614,919.            granted January 18, 1927.

to CLAYTON A. DUNHAM.

It is hereby certified that error appears in the printed specification of the above mentioned patent requiring correction as follows: Page 4, lines 83 and 84, claim 2, strike out the words "the upper critical temperature" and insert "one of these critical temperatures"; same page, line 89, claim 3, after the word "signal" strike out the comma; page 5, line 83, claim 11, for the words "A temperature" read "In a temperature"; and that the said Letters Patent should be read with these corrections therein that the same may conform to the record of the case in the Patent Office.

Signed and sealed this 22nd day of February, A. D. 1927.

Seal.

M. J. Moore,
Acting Commissioner of Patents.